(12) United States Patent
Cortinas Albuquerque et al.

(10) Patent No.: US 12,188,888 B2
(45) Date of Patent: Jan. 7, 2025

(54) METHOD AND APPARATUS FOR EVALUATING HYDROGEN CHLORIDE EVOLUTION AS A FUNCTION OF TEMPERATURE

(71) Applicant: PETROLEO BRASILEIRO S.A.—PETROBRAS, Rio de Janeiro (BR)

(72) Inventors: Flavio Cortinas Albuquerque, Petropolis (BR); Claudio Roberto Ribeiro Da Silva, Rio de Janeiro (BR); Nathalie Sanghikian, Rio de Janeiro (BR); Mauricio Souza De Alencar, Rio de Janeiro (BR)

(73) Assignee: PETROLEO BRASILEIRO S.A.—PETROBRAS, Rio de Janeiro (BR)

( * ) Notice: Subject to any disclaimer, the term of this patent is extended or adjusted under 35 U.S.C. 154(b) by 723 days.

(21) Appl. No.: 17/319,470

(22) Filed: May 13, 2021

(65) Prior Publication Data
US 2021/0356416 A1    Nov. 18, 2021

(30) Foreign Application Priority Data
May 15, 2020    (BR) ........................ 102020009844-6

(51) Int. Cl.
| | |
|---|---|
| G01N 25/48 | (2006.01) |
| B01L 3/00 | (2006.01) |
| B01L 3/08 | (2006.01) |
| B01L 7/00 | (2006.01) |
| B01L 9/04 | (2006.01) |
| G01N 27/416 | (2006.01) |

(52) U.S. Cl.
CPC ............ *G01N 25/4886* (2013.01); *B01L 3/08* (2013.01); *B01L 3/561* (2013.01); *B01L 7/00* (2013.01); *B01L 9/04* (2013.01); *G01N 25/482* (2013.01); *G01N 27/4166* (2013.01); *B01L 2200/12* (2013.01); *B01L 2300/0645* (2013.01); *B01L 2300/1805* (2013.01); *B01L 2400/082* (2013.01)

(58) Field of Classification Search
None
See application file for complete search history.

(56) References Cited

U.S. PATENT DOCUMENTS

2019/0375635 A1* 12/2019 Bulan .................. C01B 7/0706

* cited by examiner

*Primary Examiner* — Erica S Lin
(74) *Attorney, Agent, or Firm* — RAPHAEL BELLUM PLLC

(57) ABSTRACT

The present invention is in relation to a method and its apparatus, by means of which HCl generation formed from hydrolysis reactions or thermal decomposition of chloride salts is continuously monitored. Its application is in oil refining or in any other area where chloride salts are heated to temperatures high enough to cause hydrolysis reactions or thermal decomposition. The invention allows for a much more sophisticated and precise record of the thermal events that occur as a function of temperature. It also allows the behavior of chloride salts subjected to these conditions to be evaluated, both in model systems and in industrial saline solutions, with respect to the respective content, composition, or presence of components in the oil phase, such as carboxylic (naphthenic acids) or nitrogenous (ammonia or amines) acids.

20 Claims, 5 Drawing Sheets

METHOD AND APPARATUS FOR EVALUATING HYDROGEN CHLORIDE EVOLUTION AS A FUNCTION OF TEMPERATURE

FIELD OF THE INVENTION

The present invention is in relation to a method and its apparatus, to be used for continuous monitoring of hydrogen chloride (HCl) generation from hydrolysis reactions or thermal decomposition of chloride salts. Such reactions occur at temperatures typically found during oil distillation, and which are undesirable, as HCl causes corrosion and salt deposits in fractionating columns. The invention allows for a much more sophisticated and precise record of the thermal events brought about as a function of temperature. It also allows the behavior of chloride salts subjected to these conditions to be evaluated, both in model systems and in industrial saline solutions, with respect to the respective content, composition, or presence of components in the oil phase, such as carboxylic (naphthenic acids) or nitrogenous (ammonia or amines) acids.

DESCRIPTION OF THE STATE OF THE ART

Chloride salts are, in general, very poorly soluble in oil, being dragged to the fractionation tower in emulsified water droplets. With the exception of petroleum carboxylic acids (naphthenic acids), little or no participation of the hydrocarbon matrix in the reactions is expected, except as a thermal fluid. The rate of HCl generation during distillation therefore depends heavily on the composition of this emulsified aqueous solution and on the temperature. With that in mind, Eaton and colleagues (2005) set up a laboratory inspired by Davis and colleagues (L L Davis, J. M. Jones, and C. A. Neilson, "Laboratory Control of Corrosion of Distillation Equipment and Desalting Processes," Oil and Gas Journal, 37, No. 2, 62 (1938)) where petroleum or paraffin oil with a high boiling point, containing different levels of sodium chloride, magnesium chloride and calcium chloride, are heated to 350° C.

There were other publications in 2008 and 2009 (M. R. Gray, P. E. Eaton, T. Le, "Kinetics of Hydrolysis of Chloride Salts in Model Crude Oil," Petroleum Science and Technology, v. 26, pp. 1924-1933, 2008; Y. Londono, R. Mikula, P. Eaton, M. R. Gray, "Interaction of Chloride Salts and Kaolin Clay in the Hydrolysis of Emulsified Chloride Salts at 200-350° C.," Petroleum Science and Technology, v. 27, pp. 1163-1174, 2009). In these publications, a method is described in which, during temperature programming, the salt-containing fluid is continuously purged by steam. A downstream condensation system condenses steam and HCl that derives from the fluid at a certain temperature, the chloride content being determined by ion chromatography in the condensed water. Once the outflow of steam and the temperature in the flask are known, the HCl evolution curve is derived as a function of temperature.

However, this type of configuration makes it impossible to continuously monitor the evolution of chloride, since it is necessary to accumulate condensed water. Important information is therefore lost, such as the instantaneous rate of HCl generation as a function of temperature. The publications also do not mention the determination of ammonium chloride ($NH_4Cl$) on the top of the apparatus.

The formation of $NH_4Cl$ deposits inside fractionating columns can be extremely harmful to the operation and the integrity of the equipment. The tendency for $NH_4Cl$, to accumulate the formation of which is largely dependent on the composition of droplets from the aqueous phase emulsified in oil, is essential information in predicting possible complications during distillation.

Oil distillation units may be subject to corrosion and salt deposits. Both processes generally occur in the upper section and on top of fractionating columns, where there is condensation of light hydrocarbons and steam. The origin of the corrosion is mainly linked to hydrogen chloride (HCl), an acidic gas that is produced in the hotter regions of the fractionators, from chloride salts present in oil. At the top of the column, HCl may either dissolve in condensed water and form hydrochloric acid, which causes acid corrosion, or it may react with ammonia ($NH_3$) and produce $NH_4Cl$, a solid that causes under-deposit corrosion.

The reactions that give rise to HCl are generically known as hydrolysis and result from the reaction between certain chloride salts with steam:

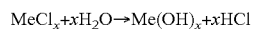

$$MeCl_x + xH_2O \rightarrow Me(OH)_x + xHCl$$

where $MeCl_x$ is, for example, magnesium chloride ($MgCl_2$) or calcium chloride ($CaCl_2$). In the case of magnesium chloride, hydrolysis may also occur due to decomposition of the hydrated salt ($MgCl_2 \cdot 6H_2O$), which occurs after vaporization of the emulsified water droplets.

These reactions typically occur starting at 250° C. However, other chloride salts that might be in the oil can produce HCl when heated, even in the absence of water. Examples of these salts are ammonium chloride ($NH_4Cl$) or amines, which decompose thermally at the temperatures at the bottom of a distillation column:

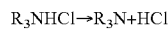

$$R_3NHCl \rightarrow R_3N + HCl$$

where R can be a hydrogen atom or an alkyl or aryl radical.

In general, therefore, the less efficient the desalting of an oil, the more intense HCl generation must be during its distillation, and the greater the acidity and chloride content of the water on the surface. However, the way in which the different chloride counterions ($Na^+$, $Mg^{2+}$, $Ca^{+2}$, $NH_4^+$, etc.) are distributed is also of paramount importance.

Industry experience shows that different oils, when distilled, have different HCl evolution rates. The intensity with which a given oil generates HCl is evaluated from the pH and the chloride content in the condensed water at the top of the distillation. It may also be inferred from the chloride content in the oil prior to distillation, which typically must be lower than 5 mg/kg.

Although these determinations are useful for monitoring of the unit, and they generate information regarding processing, these parameters do not allow the potential for HCl evolution of a given oil shipment to be anticipated. It is therefore necessary to have a way to determine the potential HCl generation of an oil when it is distilled, so that a refinery will be able to project the behavior of a shipment.

Patent PI11004231 discloses a process and system for extracting salts from crude oil, specifically light and heavy oils. Specifically, the invention reveals an extraction of salts in oil with constant heating and boiling for specific periods of time. The extraction of the salts occurs via solvents contained in the oil and analysis is performed by potentiometric titration.

Document PI11005360 discloses a process for extracting salts from crude oil, specifically light oils. In particular, the invention describes the extraction of petroleum salts by means of mechanical stirring and without constant heating. More specifically, the invention comprises an extraction of salts via solvents added to the oil, followed by analysis using potentiometric titration. For the extraction process, an Erlenmeyer flask and a magnetic stirrer (mechanical stirring using a magnetic bar) are used. The oil/solvent mixture is previously heated to facilitate the mixing process.

U.S. Pat. No. 6,902,662 discloses a method for reducing the hydrolysis of chlorinated compounds contained in hydrocarbon fractions. Hydrolysis occurs at elevated temperatures and in the presence of water, forming hydrochloric acid. Hydrochloric acid is neutralized by a treatment agent composed of at least one complex oxide or metal carbonate with an organic acid dispersing agent. The treatment agent is introduced into the hydrocarbon stream between the desalter and the oven, in a place where the temperature is lower than that of the hydrolysis of chloride salts.

The document "FORTUNY, M. et al. "Measuring salinity in crude oils: Evaluation of methods and improved procedure," Fuel, v. 87, pp. 1241-1248, 2008, reveals a procedure developed to determine the amount of salts present in crude oils for which the available laboratory techniques are unable to provide accurate salt content values. The technique is based on mixing water with crude oil by stirring, forming an emulsion. Then water is separated by microwave energy irradiation for several minutes. This three-step process involves emulsification of the salt-free washing water into crude oil, followed by recovery of the water by microwave heating, and finally, analysis of the salt content using the classic Mohr titration method.

The document "MORIGAKI, M. K. et al. "Salinidade em Petróleo Bruto: Otimização de Metodologia e Proposta de um Novo Método para Extração de Sais em Petróleo, Quimica Nova" [Salinity in Crude Oil: Optimization of Methodology and Proposal of a New Method to Extract Salts from Petroleum], Quimica Nova, v. 33, pp. 607-612, 2010, presents a study to implement changes to improve the ASTM D 6470 method and a new methodology for extracting salts using a mechanical stirring process without heating. The results from optimization produce greater efficiency and safety in the process, compared to the traditional ASTM method.

It is therefore important to emphasize that there are methods for measuring salts in crude oil, but none continuously monitor HCl generation due to hydrolysis reactions or thermal decomposition of chloride salts as the present invention does.

By continuously monitoring HCl generation, the method of the present invention allows for a sophisticated and precise record of thermal events that occur during oil distillation, allowing the behavior of model systems or industrial saline solutions to be predicted, both in terms of content or composition of chloride salts, in regard to the influence of nitrogenous components (ammonia or amines) or carboxylic acids (naphthenic acids).

The present invention is used to evaluate the composition of industrial saline solutions on the evolution of HCl, $NH_4Cl$ and amine chloride during oil distillation, contributing to the prevention of production losses resulting from equipment replacement and cleaning of fractionating columns, in addition to assisting in the optimal allocation of oil in a group of refineries.

The present invention also allows the composition of industrial saline solutions on the evolution of HCl, $NH_4Cl$ and amine chloride during the distillation of oil to be evaluated, reducing the possibility of serious issues, such as the appearance of holes in fractionating columns and in related equipment resulting from uncontrolled corrosion, which can lead to loss of liquid containment and fires in refineries.

In addition, the present invention also makes it possible to evaluate the composition of industrial saline solutions on the evolution of HCl, $NH_4Cl$ and amine chloride during oil distillation, resulting in maximization of the campaign time of fractionating columns and related equipment.

BRIEF DESCRIPTION OF THE INVENTION

The present invention is in relation to a method and its apparatus for continuous monitoring of HCl generation, resulting from hydrolysis reactions or thermal decomposition of chloride salts. The system provides an accurate record of the thermal events that occur during oil distillation, thus allowing the behavior of model systems or industrial saline solutions to be predicted, both with respect to the content of chloride salts, and the influence of nitrogenous components (ammonia or amines) or carboxylic acids (naphthenic acids).

The invention is applicable in the prior assessment of the aggressiveness of petroleum with regard to HCl generation and the deposit of solids, such as ammonium chloride or amine chlorides, thus contributing to the integrity and reliability of oil fractionating columns and respective top systems.

The invention is also applicable to the research and development of factors related to the composition and temperature of chloride evolution in petroleum distillation conditions, as well as to the study of additives that are able to mitigate HCl evolution.

BRIEF DESCRIPTION OF THE DRAWINGS

The present invention will be described in more detail below, referencing the attached figures which, schematically and in a manner that is not limiting on the inventive scope, show examples of the invention's embodiments. The drawings are as follows.

DETAILED DESCRIPTION OF THE INVENTION

Figure 1:
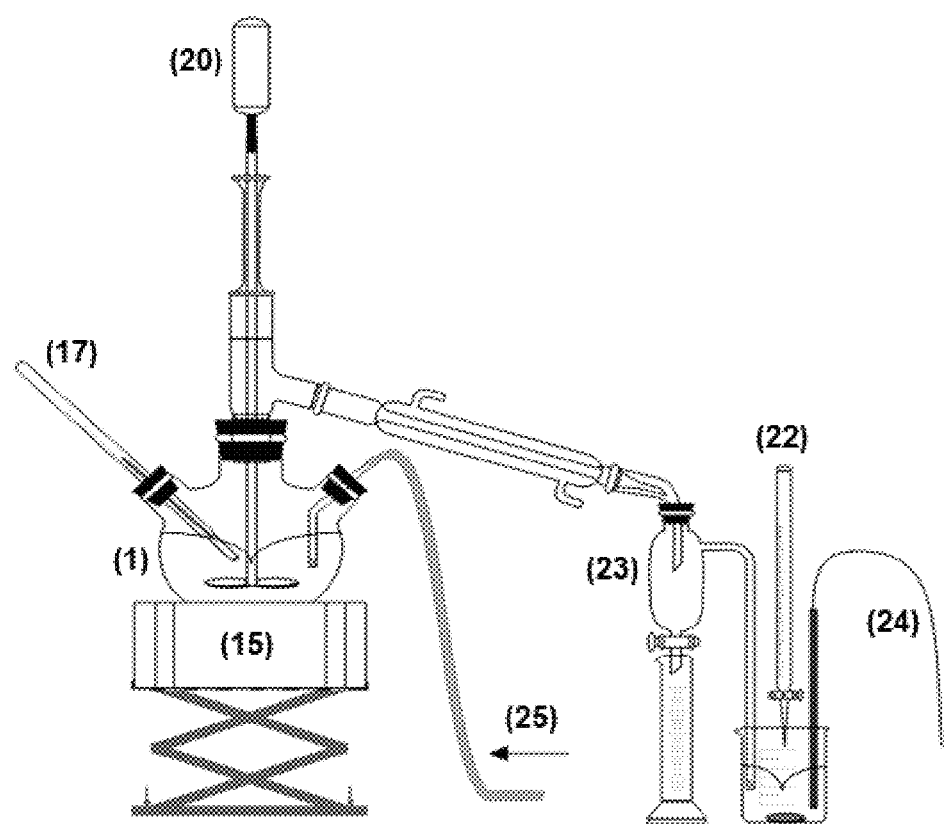
FIG. 1 contains a drawing of an apparatus for evaluating hydrogen chloride evolution that is comprised of: heating mantle (15), three-way round-bottom flask (1), temperature sensor (type K thermocouple) (17), stirring motor and transmission (20), condensate decantation funnel (23), burette containing standardized $AgNO_3$ solution (22) and sensor (electrode) (24) for potentiometric titration.
Figure 2:
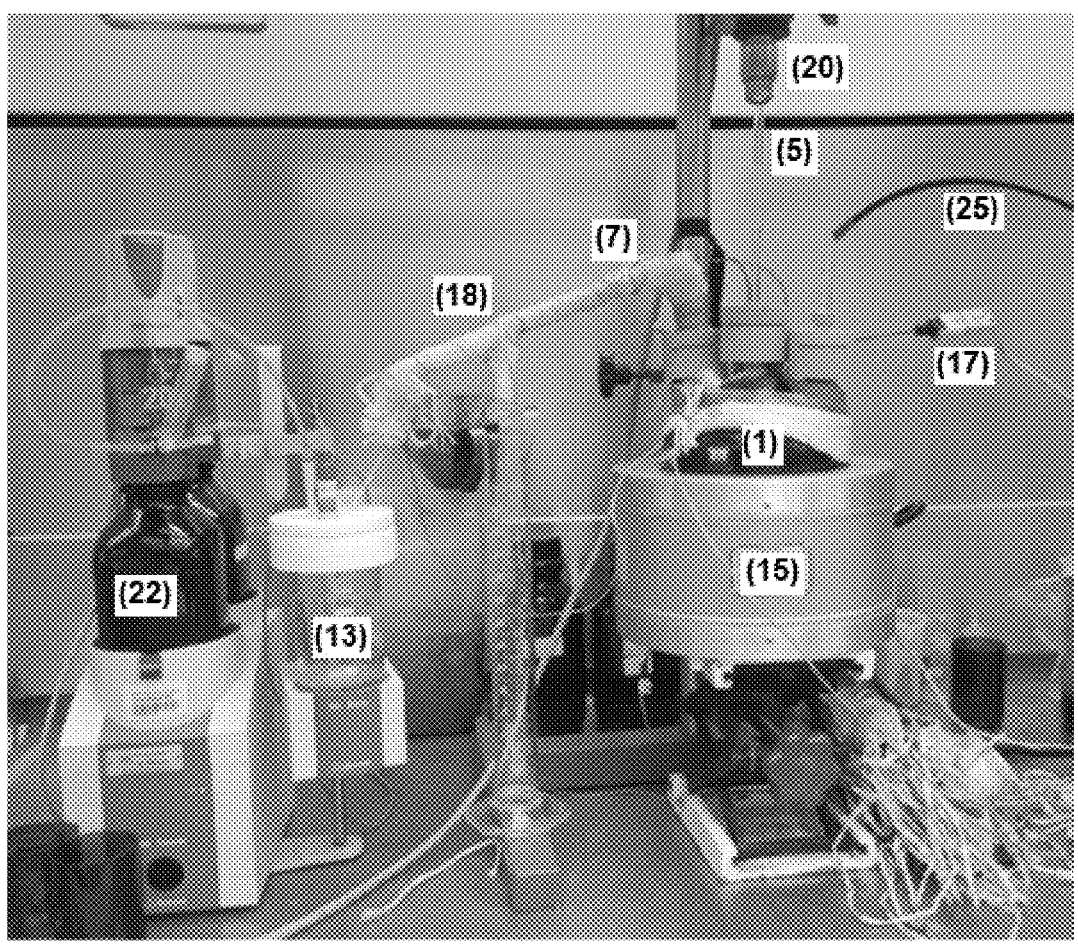
FIG. 2 contains an apparatus for evaluating hydrogen chloride evolution that is comprised of: heating mantle (15), three-way round bottom flask (1), type K thermocouple (17), nitrogen supply (25), stirring rod (5) and motor (20), gas-conduction pipe (7) wrapped in heating tape, and a small adapted separation funnel (18), 250 mL beaker (13) for absorption and potentiometric titration of HCl and burette containing standardized $AgNO_3$ solution (22)
Figure 3:
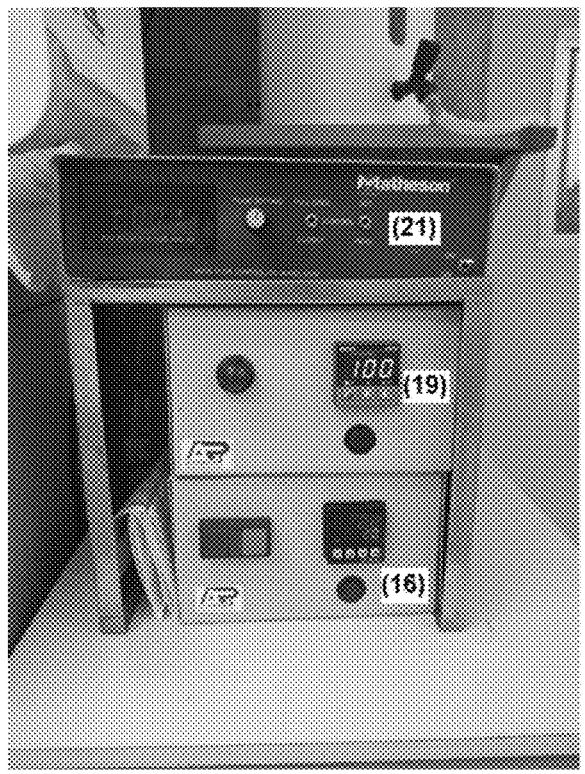
FIG. 3 shows a flow controller (21), a heating strip temperature controller (19), and a blanket temperature controller (16)
Figure 4:
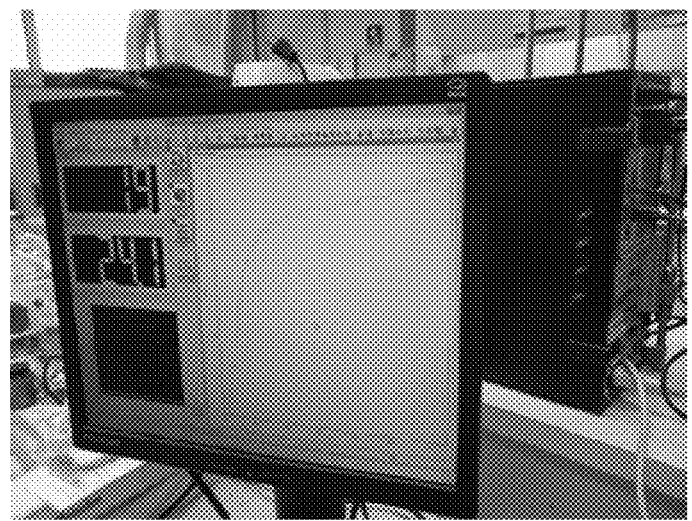
FIG. 4 shows a computer and temperature data acquisition programs, and potentiometric titration with $AgNO_3$ (volume of titrant added, and electrochemical potential of the HCl absorption solution)

The present invention deals with a method and its apparatus for continuous monitoring of HCl generation, resulting from hydrolysis reactions or thermal decomposition of chloride salts.

Hydrolysis or thermal decomposition occurs in a flask containing paraffin oil, to which a known mass of chloride salts, pure and/or dissolved in water has been added. The mixture is stirred throughout the entire test and heated according to a certain temperature ramp.

As the temperature of the paraffin oil rises, the hydrogen chloride generated in the flask is continuously dragged by the flow of an inert gas (nitrogen or helium, for example). The gas flow containing HCl is bubbled in water, contained in a flask for potentiometric titration. Hydrogen chloride is instantly absorbed, which causes a variation in the electrochemical potential of the medium. The variation is perceived by an appropriate sensor (electrode), which automatically sends the information to a potentiometric titrator. The titrator adds a titrant solution (standardized solution of AgNO3, NaOH or KOH, for example) in order to bring the electrochemical potential back to its original value. This process is repeated continuously throughout the test, until it is finished at the discretion of the operator or until the hydrolysis reactions or thermal decomposition of chloride salts are exhausted.

Data on the temperature of the paraffin oil, the electrochemical potential of the solution, and the volume of titrant are transmitted to a computer, which is also responsible for controlling the potentiometric titrator and processing the information. The titrant consumption corresponds to a certain mass of HCl that reaches the titration flask, which in turn occurs at a certain time following the start of the test, and at a certain temperature of the paraffin oil. In the end there are curves that plot the HCl generation rate and the total HCl generated as a function of time and temperature.

The present invention also reveals the apparatus, as well as its method of assembly, for evaluating hydrogen chloride as a function of temperature.

The apparatus consists of the following components:
(1) modified three-way round-bottom flask;
(2) universal support;
(3) lifting platform (jack type);
(4) tube with gas disperser at the end, made of sintered glass;
(5) stirring rod and propeller, made entirely of glass;
(6) stirring rod guide;
(7) gas-conducting tube;
(8) connectors;
(9) nitrile rubber retainers;
(10) silicone hose;
(11) small hose with gas-dispersing tube, made of sintered glass;
(12) 25-mL capacity beaker;
(13) 250-mL beaker for potentiometric titrator;
(14) oil with a high initial boiling point (paraffin oil);
(15) Glas-Col heating mantle;
(16) mantle temperature controller;
(17) Type K thermocouples (Cromel-Alumel);
(18) heating tapes;
(19) heating ribbon temperature controller;
(20) stirring motor (IKA RW 20);
(21) flow controller;
(22) potentiometric titrator (Metrohm 809 Titrando);
(23) small adapted separation funnel;
(24) sensor (electrode);
(25) nitrogen supply.

The method of assembling the apparatus is described below:
a) support the flask (1) with oil (14) on top of the heating mantle (15) and secure it by the larger mouth to a universal support set-mufa-claw (2);
b) lay the heating mantle (15) on an elevating platform (3), to adjust the height of the system;
c) insert the stirring rod (5) into the PEEK connection (8) provided with retainers (9), which connect to the central mouth of the flask (1);
d) use silicone grease to facilitate the passage of the rod (5) through the retainers (9);
e) connect the rod (5) to the stirring motor (20);
f) carefully place this assembly into the larger mouth of the flask (1) and attach it to the stirring motor (20), always checking system alignment;
g) connect the tube with gas disperser (4) to one side of the flask (1);
h) fit a hose (10) to the upper end of this tube through which the inert gas (nitrogen) from the flow controller (21) will pass;
i) use two heating tapes (18), one for the upper part of the flask (1) and the other for the gas-conducting tube (7), electrically connected;
j) wrap one of the heating tapes (18) in the conductive tube, including the separation section in the middle of the tube (7);
k) wrap the thermocouple (17) and leave its end as close as possible to the separating funnel. Thus, the tube set (7)+thermocouple (17) will be wrapped in the heating tape;
l) attach the conductive tube (7) to the other side of the flask (1) with the help of PEEK connectors (8);
m) wrap the second heating tape (18) on the upper part of the three-necked flask (1), in particular around the necks;
n) electrically connect the two heating tapes (18) to two of the tapes' temperature-controlling wires (19);
o) at the other end of the conducting tube (7), attach a small PTFE hose with a second gas-dispersing tube (made of sintered glass) (11);
p) place the immersed sintered glass (4) in a 250-ml beaker (13) with a predetermined amount of deionized water (190 ml), in which the set is supported on the titrator's magnetic stirring base (22);
q) connect a second thermocouple (17) to the respective inlet of the flask (1), dipping its end into the paraffin oil (14) and away from the stirring propeller (5).

The method for acquiring HCl evolution data comprises the following steps:
a) weigh the pre-determined mass of paraffin oil (14) in the three-way flask (1);
b) weigh pre-determined masses of chloride salts and dissolve them in water;
c) weigh the solution to be added to the flask;
d) reconnect the disconnected in order to add the sample;
e) activate flow controller (21);
f) activate the agitation motor (20);
g) activate the heating controller of the gas-conducting tube (19);

h) start the heating program on the controller (17) of the mantle (15);
i) initiate burette control;
j) start data acquisition in the potentiometric titrator (22).

EXAMPLES

The following tests were carried out for this study, which are examples of embodiments of the present invention.

Example 1: 4-nitro-anilinium Chloride 117.2 mg of 4-nitro-anilinium chloride were added to 1,095 kg of chloride-free vacuum-hydrogenated gasoil (paraffin oil) contained in a three-way flask, which was heated according to the following temperature curve:
i. 35° C., for 2 minutes;
ii. 35° C. to 120° C., in 72 minutes;
iii. 120° C., for 180 minutes (isothermal).

Along the entire heating curve, $N_2$ was bubbled into the paraffin oil at a flow rate of 180 mL/min. The gas flow was conducted to a flask containing 190 mL of water, whose electrochemical potential was adjusted to 20 mV. At each displacement of the initial electrochemical potential, resulting from the introduction of HCl into the flask, an $AgNO_3$ solution with a concentration of 0.1 mol/L was added by an automatic titrator until the return to the initially adjusted electrochemical potential.

Figure 5:
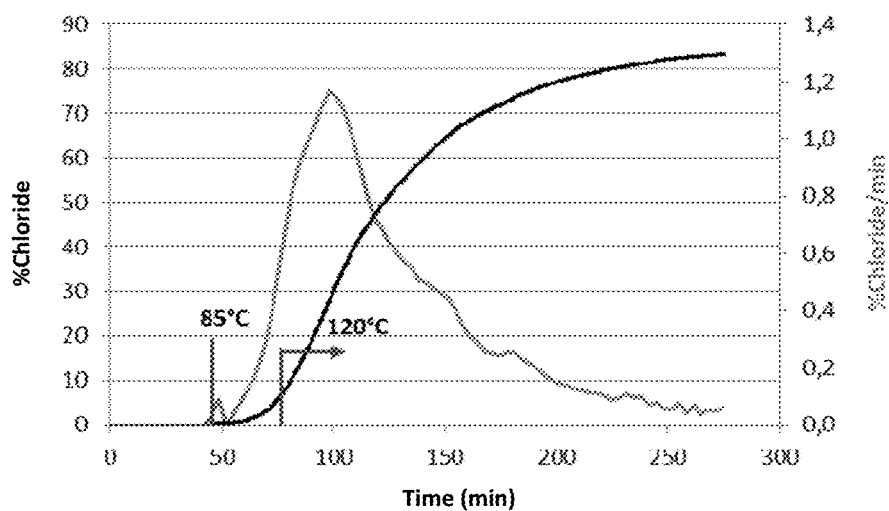
FIG. 5 shows a graph of % accumulated chloride and % instantaneous chloride, as a function of the time of the experiment, referring to Example 1.

Finally, the titrant consumption curve, and consequently the evolution of HCl over the temperature program, are obtained. As can be seen in FIG. 5, the percentage of chloride evolution in relation to the mass of 4-nitro-anilinium chloride added to the paraffin oil, was 83%.

Example 2: Mixture of Alkali Metal Chlorides 76.6 mg of sodium chloride (NaCl), 37.1 mg of calcium chloride dihydrate ($CaCl_2.2H_2O$) and 24.6 mg of magnesium chloride hexahydrate ($MgCl_2 \cdot 6H_2O$) were diluted in 5 mL of deionized water. This solution was transferred to a round-bottom flask containing 900 g of synthetic lubricating oil (paraffin oil).

The following temperature program was used:
i. 35° C., for 2 minutes;
ii. 35° C. to 100° C., in 30 minutes;
iii. 100° C. to 150° C., in 60 minutes;
iv. 150° C. to 330° C., in 150 minutes;
v. 330° C. for 240 minutes (isothermal).

Along the entire heating curve, $N_2$ was bubbled into the paraffin oil at a flow rate of 180 mL/min. Because an aqueous solution was added to the paraffin oil in this example, and not a pure substance, the line that leads the flow of $N_2$ containing HCl to the flask where the titration occurs was kept at 150° C. to prevent water condensation. The electrochemical potential of the water where HCl is absorbed and titrated with $AgNO_3$ with a concentration of 0.01 mol/L was adjusted to 29.8 mV. With each displacement of the initial electrochemical potential resulting from introduction of HCl into the flask, titrant is added by an automatic titrator until the return to the initial electrochemical potential.

Figure 6:
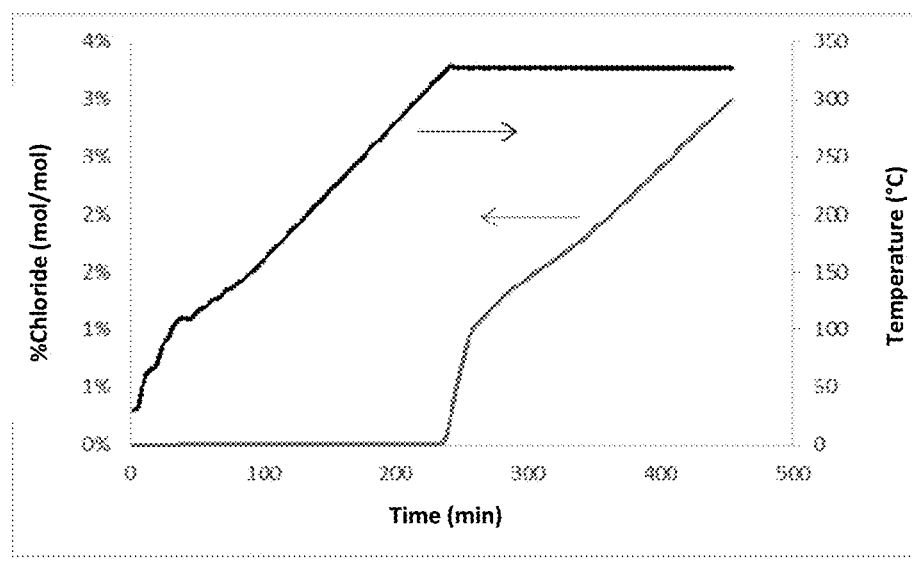
FIG. 6 shows a graph of % accumulated chloride and temperature of paraffin oil, as a function of the time of the experiment, referring to Example 2.

Finally, the titrant consumption curve is obtained, and consequently the evolution of HCl over the temperature program. As shown in FIG. 6, the chloride evolution percentage in relation to the total mass of chloride added to the paraffin oil was 3.6%.

Figure 7:
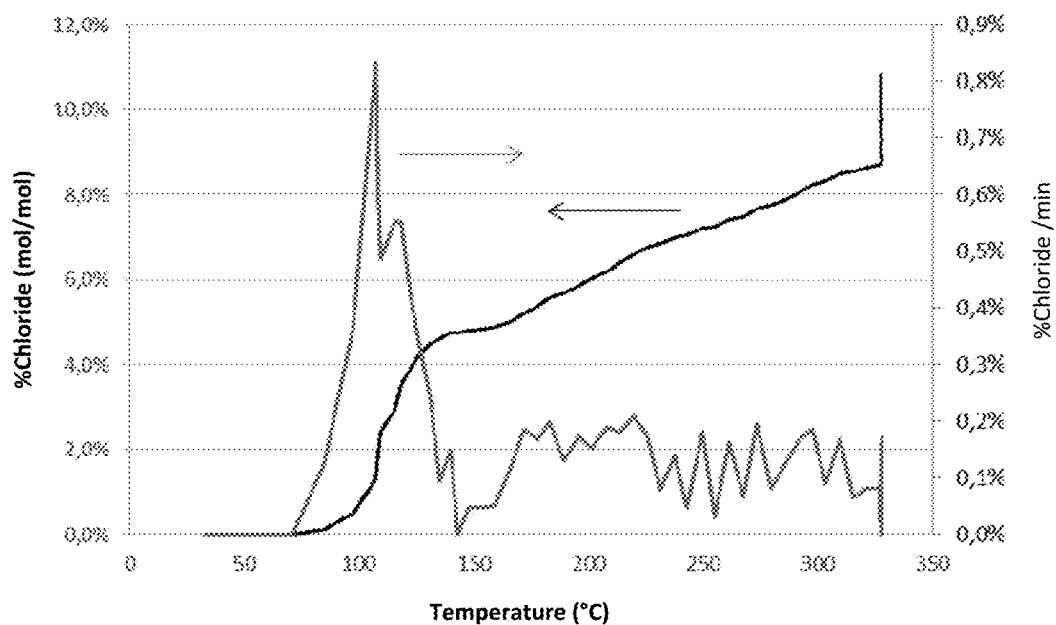
FIG. 7 shows a graph of % accumulated chloride and % instantaneous chloride, as a function of the temperature of the paraffin oil, referring to Example 3.

Example 3: Industrial Saline Solution 5 ml of industrial saline solution was added to the same paraffin oil in Example 2, containing 120 mg/L sodium, 26 mg/L calcium, 5.5 mg/L magnesium, 610 mg/L chloride and 129 mg/L nitrogen. The same temperature program as that used with the paraffin oil and the transfer line to the titration flask was used. HCl evolution intensified from 110° C. and at the end reached 11%, as seen in FIG. 7.

Note that although the present invention has been described in relation to the attached drawings, it may undergo modifications and adaptations by technicians versed in the subject, depending on the specific situation, but as long as it is within the inventive scope defined herein.

The invention claimed is:

1. A method of constructing a system including a flask having a plurality of mouths for evaluating hydrogen chloride as a function of temperature, the method comprising:
providing a heating mantle on a lifting platform;
securing the flask on top of the heating mantle, wherein the flask includes paraffin oil;
adjusting a height of the lifting platform;
applying silicone grease to a portion of a stirring rod to facilitate passage of the stirring rod through a hole in a first connector, wherein a propeller is coupled on the stirring rod;
inserting the stirring rod through the hole in the first connector;
connecting the stirring rod to a stirring motor;
after the stirring rod is inserted through the hole in the first connector, inserting the first connector into a first mouth of the flask;
checking alignment of at least one of the heating mantle, the flask, the propeller, the stirring rod, or the stirring motor;
connecting a first end of a gas-dispersing tube to the flask;
fitting a hose to a second end of the gas-dispersing tube, wherein the hose is configured to allow inert gas to pass through the hose and the gas-dispersing tube into the flask;
wrapping a gas conducting tube with a first heating tape;
attaching the gas-conducting tube to the flask;
wrapping at least one of the plurality of mouths of the flask with a second heating tape;
electrically connecting the first heating tape and the second heating tape with a temperature control device;
attaching a first end of a Polytetrafluoroethylene (PTFE) hose to a second end of the gas-conducting tube;
connecting a second end of the PTFE hose with a separating funnel including a sintered glass tube;
providing the sintered glass tube of the separating funnel into a 250 ml beaker with a predetermined amount of deionized water; and
connecting a first temperature sensor to the flask such that a first end of the first temperature sensor touches the paraffin oil.

2. The method of claim 1, wherein the first mouth of the flask is secured with a universal mount-clip-clamp over the heating mantle.

3. The method of claim 1, wherein the first connector is made of Polyether ether ketone (PEEK).

4. The method of claim 3, wherein the first connector includes a retainer that couples with an edge of the first mouth of the flask.

5. The method of claim 1, wherein a diameter of the first mouth of the flask is greater than a diameter of at least one of a second mouth of the flask or a third mouth of the flask.

6. The method of claim 1, wherein the gas-dispersing tube is mounted with respect to the first mouth of the flask.

7. The method of claim 1, wherein the gas dispersing tube is mounted in a second mouth of the flask.

8. The method of claim 1, wherein the hose is mounted in the third mouth of the flask.

9. The method of claim 1, wherein the hose and the temperature sensor are mounted with respect to the third mouth of the flask.

10. The method of claim 1, wherein the gas conducting tube comprises a separating section in a middle portion of the gas conducting tube.

11. The method of claim 10, wherein the first heating tape is wrapped around a portion of the separating section.

12. The method of claim 1, further comprising:
securing a second temperature sensor to the gas-dispensing tube using the first heating tape.

13. The method of claim 12, wherein the second temperature sensor is mounted on the gas-dispensing tube such that an end of the second temperature sensor is provided near the separating funnel.

14. The method of claim 1, wherein the stirring rod and the propeller are made of glass.

15. The method of claim 1, wherein the gas-conducting tube is attached to the flask using a Polyether Ether Ketone (PEEK) connector.

16. The method of claim 1, wherein the gas-conducting tube is attached to a second mouth of the flask.

17. The method of claim 1, wherein the gas-conducting tube is attached to the first mouth of the flask.

18. The method of claim 4, wherein the first heating tape and the second heating tape are electrically coupled with the temperature control device via temperature controlling wires.

19. The method of claim 1, wherein the 250-ml beaker is supported by a magnetic stirring base.

20. A system for evaluating hydrogen chloride as a function of temperature, the system comprising:
a flask having a plurality of mouths;
a heating mantle configured to provide heat to the flask;
a lifting platform, wherein the heating mantle is provided on the lifting platform;
a stirring rod including a propeller;
a first connector configured to receive the stirring rod;
a stirring motor coupled to the stirring rod;
a gas-dispensing tube;
a hose coupled with the gas-dispensing tube, the hose configured to allow inert gas to pass through the hose and the gas dispensing tube into the flask;
a gas conducting tube;
a first heating tape;
a second heating tape;
a temperature control device;
a separating funnel including a sintered glass tube;
a Polytetrafluoroethylene (PTFE) hose configured to connect the gas-conducting tube with the separating funnel;
a 250 ml beaker; and
a first temperature sensor.

* * * * *